United States Patent
Preuss et al.

(10) Patent No.: US 12,351,748 B2
(45) Date of Patent: Jul. 8, 2025

(54) PARTABLE LAMINATE AND METHOD FOR PARTING LONG-TERM BONDS

(71) Applicant: tesa SE, Norderstedt (DE)

(72) Inventors: Philipp Preuss, Neu-Lankau (DE); Arne Koops, Norderstedt (DE)

(73) Assignee: TESA SE, Norderstedt (DE)

( * ) Notice: Subject to any disclaimer, the term of this patent is extended or adjusted under 35 U.S.C. 154(b) by 209 days.

(21) Appl. No.: 18/069,407

(22) Filed: Dec. 21, 2022

(65) Prior Publication Data

US 2023/0203351 A1    Jun. 29, 2023

(30) Foreign Application Priority Data

Dec. 23, 2021 (DE) .................... 10 2021 134 447.6

(51) Int. Cl.
*C09J 7/38* (2018.01)
*C09J 7/24* (2018.01)

(52) U.S. Cl.
CPC ................. *C09J 7/385* (2018.01); *C09J 7/24* (2018.01); *C09J 2301/124* (2020.08); *C09J 2433/006* (2013.01)

(58) Field of Classification Search
CPC ........ C09J 7/385; C09J 7/24; C09J 2301/124; C09J 2433/006; C09J 2203/326; C09J 2203/354; C09J 5/00; C09J 2301/408; C09J 2301/416; C09J 2301/502; C09J 2433/00; C09J 2301/302; C09J 133/04; C08K 3/22; C08K 2003/2241; C08K 3/04
See application file for complete search history.

(56) References Cited

U.S. PATENT DOCUMENTS

| 7,438,963 | B2 | 10/2008 | Koops et al. | |
| 10,232,586 | B2 | 3/2019 | Dollase et al. | |
| 10,907,076 | B2 | 2/2021 | Dietze et al. | |
| 2004/0209086 | A1 | 10/2004 | Koops et al. | |
| 2009/0075074 | A1* | 3/2009 | Horio ................ | G02B 1/116 427/163.1 |
| 2016/0167339 | A1* | 6/2016 | Dollase ................ | C09J 5/00 156/332 |

FOREIGN PATENT DOCUMENTS

| DE | 81 30 861 U1 | 10/1981 |
| DE | 100 48 665 A1 | 4/2002 |
| DE | 101 42 638 A1 | 5/2003 |

(Continued)

OTHER PUBLICATIONS

Machine Translation of WO 2023/053538A1 (Year: 2024).*

*Primary Examiner* — Scott R. Walshon
(74) *Attorney, Agent, or Firm* — Norris McLaughlin, PA

(57) ABSTRACT

Laminates designed and equipped to be separated after long-term bonding are provided. The laminates comprise a first pressure sensitive adhesive layer, a separation layer, and a second pressure sensitive adhesive layer. The separation layer comprises a laser-sensitive pigment which at the same time is coloring, and so preferably a black coloration is produced, and consists of a cured coating material, preferably an electron beam-cured or UV-cured coating material, which is at least partly removable by laser irradiation, wherein the first pressure sensitive adhesive layer and/or the second pressure sensitive adhesive layer are laser beam-translucent.

19 Claims, 2 Drawing Sheets

(56) References Cited

FOREIGN PATENT DOCUMENTS

| | | |
|---|---|---|
| DE | 10 2005 061 125 A1 | 6/2007 |
| DE | 10 2020 209 557 A1 | 2/2021 |
| EP | 3390553 A1 | 10/2018 |
| JP | 2014091755 A | 5/2014 |
| JP | 2018-001604 A | 1/2018 |
| WO | 2015/014582 A1 | 2/2015 |
| WO | WO-2023053538 A1 * | 4/2023 |

* cited by examiner

PARTABLE LAMINATE AND METHOD FOR PARTING LONG-TERM BONDS

The present invention relates to a laminate designed and equipped to be separated after long-term bonding, comprising a first layer of pressure sensitive adhesive, a separation layer, and a second layer of pressure sensitive adhesive. The present invention further encompasses a method for parting a long-term bond produced by means of such a laminate.

In repair shops and in the end-of-life recycling of electronic devices, the desire to be able to repair electronic devices or else automobiles, or to be able as extensively as possible to disassemble and/or recycle them, is gaining in importance for not just environmental reasons but also economic reasons.

There are different kinds of electronic devices here, differing in their recyclability and also in the degree of recycling:
- large household appliances (also called white goods): for example, washing machines, refrigerators and freezers, ovens;
- small household appliances (likewise included as white goods): for example, vacuum cleaners, coffee machines, microwaves;
- information technology and communication devices: for example, computers, monitors, printers, cell phones, telephones;
- consumer electronic devices (also called brown goods): for example, televisions, video recorders, digital cameras.

Electrical and electronic devices in particular contain a multiplicity of substances and materials. If used electrical and electronic devices are disposed of improperly, such as via the household garbage, for example, environmental risks may arise from the pollutants they still contain in some cases. As well as pollutants such as heavy metals and HCFCs, however, used electrical and electronic devices also contain a range of valuable substances, which should be recovered and therefore recirculated. Where, conversely, used electrical and electronic devices are disposed of properly, it is possible to replace primary raw materials (and hence their costly and laborious extraction) and to make a substantial contribution to the preservation of the natural resources.

In order to be able to achieve these objectives, there are specific obligations imposed on all relevant actors (manufacturers, trade, municipalities, owners, waste managers) in Germany by the law governing the sale, return, and environmentally sound disposal of electrical and electronic equipment (Electrical and Electronic Equipment Law—ElektroG) in implementation of Directive 2012/19/EU concerning waste electrical and electronic equipment (WEEE). By avoiding waste, through reasonable tests for possibilities of preparation for the re-use of entire devices or individual components, and by requirements regarding the more extensive recovery of value from wastes, the aim is to achieve a substantial contribution to preserving natural resources and to reducing pollutant emissions.

Corresponding recycling-friendly designs are needed which enable on-demand disassembly ("debonding on demand"). The recycling-friendly designs include repartable adhesive bonds.

The reason is that, in small electronic devices in particular, there is a very sharply increasing trend toward adhesively bonding parts, usually on a long-term basis, rather than connecting them in a way which can be undone mechanically.

Film laminates in the form of double-sided adhesive tapes are employed, for example, for bonding two components to one another. In general the intention is for these components to be bonded to one another on a long-term basis by such a film laminate. This is intended to result in a correspondingly long life and durability of the bond and/or the product. Examples of components joined to one another in this way are touch panels of the kind employed in computer screens or mobile electronic devices. If one of the two components is damaged, it is completely impossible, or possibly only on application of substantial resource (force), to separate the bonded assembly again in order to replace a component. There is also the risk of the component that is not damaged suffering damage in the course of the separation.

DE 10 2020 209 557 A1 discloses a film laminate designed and equipped to be separated after long-term bonding, comprising the following layers:
- a first layer of pressure sensitive adhesive,
- a separation layer,
- a second layer of pressure sensitive adhesive, where the separation layer has a thickness of 40 nm to 500 nm, the first layer of pressure sensitive adhesive is laser beam-translucent, and the separation layer consists of a metal which is at least partly removable by laser irradiation.

In this case a metal is removed by laser, leading to the separation.

Translucency is the partial light transmissiveness of a body. The word derives from the Latin lux for light. Wax, the human skin, leaves, and many other substances are translucent, since they transmit light partially, but are not transparent. In delimitation from transparency, translucency may be described as light transmissiveness. The reciprocal property to translucency is opacity. Hence where a substance possesses high translucency, it has low opacity, and vice versa.

Light transmissiveness in the sense of the invention means transmissive at the respective wavelength of the light. This means that, for example, a black body (for example, a black-colored polymer) is opaque in the range of light that is visible for humans, but is translucent in the nonvisible range such as NIR, meaning that radiation in this wavelength range is able to pass through it.

EP 3 390 553 A1 relates to a method for bonding two surfaces by means of a reactive adhesive film system comprising at least two adhesive films (F1 and F2), the adhesive films each comprising at least one reactive component (R1 and R2), the bonding being brought about by a reaction which requires the presence of both reactive components (R1 and R2), where prior to the bonding there is a parting layer (T) which is impervious for the reactive components (R1 and R2) between the adhesive films (F1 and F2) that are to be brought into contact with one another with the reaction. In order to produce the bond, the parting layer (T) is removed over at least part of its area by means of a laser, and so the adhesive films (F1 and F2) come into direct contact with one another and the reaction ensues in the presence of the two reactive components (R1 and R2).

The parting layer may be a metal layer. This may be a metal foil which is introduced between the adhesive films during the production of the adhesive tape, by means of a laminating operation, for example.

DE 81 30 861 U1 discloses laser-writable labels having an outer layer and, disposed below it, a second coating material layer, with the coating material layer being produced from polyurethane acrylate and hexanediol bisacrylate. Building on this, DE 100 48 665 A1 discloses laser-writable labels having an electron beam-cured coating material layer. A method for producing such laser-writable labels is described in DE 101 42 638 A1, wherein an engraving layer with a UV-curable coating material is incorporated. By means of an additional compensation layer, DE 10 2005 061 125 A1 produces labels which attenuate deterioration due to high temperatures above 140° C.

The use of lasers for ablation is widespread—for example, in micromachining, certain laser beam sources can be used for ablative operations. Extremely thin layers can be removed from substrates, since the local heating leads to a particulate debris or to carbonization/evaporation. In order to realize ablation operations as sparingly as possible, lasers in the wavelength range from 800 to 2000 nm are primarily employed. For photochemical reactions with low exposure to heat, excimer lasers are frequently used. Excimer laser means that the laser beams are situated in the UV wavelength range.

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

Figure 1:
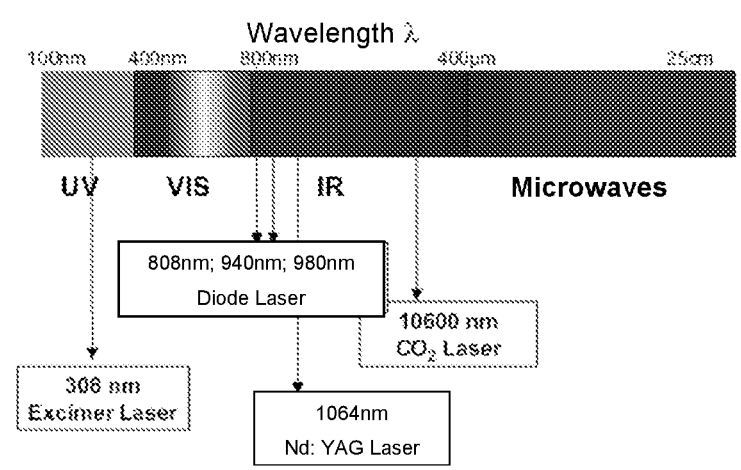
FIG. 1 illustrates laser emission wavelengths according to at least one embodiment of the present disclosure.

As shown in FIG. 1, an overview of emission wavelengths of principal lasers is provided.

The table below lists the typical properties of an Nd:YAG laser.

TABLE 1

Typical properties of an Nd: YAG laser

| | |
|---|---|
| Wavelength: | 1064 nm |
| Pulse duration: | several ps up to several ms |
| Pulse energy: | mJ up to about 100 J |
| Photon energy | 1.16 eV |
| Applications: | Microscale welding, cutting, and drilling of metals and plastics |
| Note: | Typical plastics and glass possess high transparency → hence poor machining |

Furthermore, USP (ultra-short pulse) lasers have proven particularly suitable. Ultra-short pulse lasers are laser beam sources which emit pulsed laser light having pulse durations in the range of picoseconds and femtoseconds.

Ultra-short pulse lasers emit pulses of light in which the light energy is compressed to extremely short times, with luminous powers in the megawatt range being achieved during the pulse. By means of appropriate spatial focusing, it is therefore possible to obtain intensities of many gigawatts per square centimeter. At such high intensities, there are nonlinear effects in the interaction between light and matter. One of these effects is that known as multiphoton absorption, which results in virtually any material being ablatable at sufficiently high intensities. This is true particularly of femtosecond lasers. In this case no part is played by their absorption, their hardness or their vaporization temperature, and even challenging materials such as composite materials can be readily machined.

A further advantage of ultra-short pulse lasers is their high precision. Focal diameters in the micrometer range and the low energy input per pulse enable laser ablation with high spatial resolution. The rule here is as follows: the shorter the pulse duration, the less the extent to which the surrounding material is damaged by the laser beam and the more precise the degree of metering with which the material can be ablated. The results are clean cut edges without burring, and so there is no need for reworking. In metal working, nanosecond pulses are usually sufficient; more elaborate machining requires picosecond pulses, while, for nonmetallic materials, such as ceramics, polymers, and many composite materials, femtosecond pulses are employed. The lower level of ablation of material accompanying the shorter pulse duration, however, means that machining takes longer overall. One objective in the current development work on ultra-short pulse lasers, therefore, is to increase the pulse repetition rates (number of laser pulses per second). This will raise the average power and hence the throughput in manufacturing. In the laboratory, femtosecond lasers with an average power of more than 1 kilowatt have already been demonstrated. They have pulse repetition rates of 20 megahertz, pulse energies of 55 microjoules and pulse durations of 600 femtoseconds. Available commercially today there are femtosecond lasers having average powers of not more than a few hundred watts, operating in general with ytterbium-doped laser crystals.

It is an object of the present invention, therefore, to provide a laminate which on the one hand enables long-term and reliable bonding of two components with one another, but on the other hand, as and when required, enables clean and reliable separation of the components.

The object is achieved in accordance with the invention by means of a film laminate as described in claim 1. Advantageous embodiments are reproduced in the dependent claims. Also part of the invention are a method for parting a long-term bond produced by means of a laminate of the invention, by removing at least part of the area of the separation layer by means of laser irradiation and separating the laminate into a first part-laminate and a second part-laminate, and also proposed uses of the laminate of the invention.

The present invention relates accordingly to a laminate designed and equipped to be separated after long-term bonding, comprising the following layers:
  a) a first pressure sensitive adhesive layer,
  b) a separation layer,
  c) a second pressure sensitive adhesive layer.

In accordance with the invention the separation layer is characterized by the following properties:
  the separation layer has a thickness of preferably 0.5 to 100 μm, more preferably 1 to 30 μm, especially preferably 5 to 25 μm.
  The separation layer comprises a laser-sensitive pigment which at the same time is coloring, preferably producing a black coloration.
  The separation layer consists of a cured coating material, preferably an electron beam-cured or UV-cured coating material, which is at least partly removable by laser irradiation.
  The first pressure sensitive adhesive layer and/or the second pressure sensitive adhesive layer are laser beam-translucent.

With a laminate of this kind it is possible for two substrates—for example, glass/glass, glass/metal, glass/plastic, or plastic/plastic—to be permanently bonded. As a result of the controlled removal of the thin separation layer, the composite adhesion between the two layers of pressure sensitive adhesive can be reduced to an extent that enables very easy separation of the layers—in the best case, the composite adhesion is eliminated almost entirely. This makes it possible to achieve what is referred to as reworkability, meaning that an adhesive bond which has actually been made as a connection that can no longer be altered can nevertheless be undone again. This removal of the separation layer is accomplished by ablation.

The present invention further relates to a method for parting a long-term bond produced by means of a laminate of the invention, wherein at least part of the area of the separation layer is removed by means of laser irradiation and the laminate is separated into a first part-laminate and a second part-laminate.

This preferably involves the application, to at least one of the part-laminates, of forces which increase the spacing of the two part-laminates from one another. Accordingly, the laminate can be separated into two part-laminates in a particularly effective and reliable way.

A typical construction of a laminate of the invention therefore looks as follows:
 a) first layer of pressure sensitive adhesive
 b) separation layer
 c) second layer of pressure sensitive adhesive.

It is important that either the first layer of pressure sensitive adhesive is translucent for the laser radiation used, and/or the second layer of pressure sensitive adhesive, so that the laser is able to reach the separation layer. The same applies to the substrate for bonding, at least on the side from which the laser radiation is introduced. This substrate as well must be transmissive for the laser radiation. The separation layer itself absorbs the laser radiation.

The separation layer consists of a cured coating material, preferably a radiation-cured coating material, more particularly of an electron beam-cured or UV-cured coating material.

In accordance with the invention, the coating material is admixed with laser absorbers, i.e., laser-absorbing pigments, in order to achieve an extremely efficient take-up of energy during the lasering treatment. These laser-sensitive pigments at the same time produce a coloring of the separation layer. Titanium dioxide and/or carbon black therefore serve as typical laser absorbers which at the same time bring about a coloration.

If a laser-sensitive pigment is present in the separation layer, through the addition of titanium dioxide and/or carbon black, for example, it is also possible, moreover, for other coloring pigments to be added, and so it is possible to produce a coating material layer with any desired color. The actual coloring pigment of the coating material in that case no longer needs to fulfil any particular absorption properties in respect of the laser absorption.

Suitable separation layers comprise radiation-curable systems such as unsaturated polyesters, epoxy acrylates, polyester acrylates, and urethane acrylates, of the kind also used for UV printing inks, and more particularly those composed of base polymers according to DE G 81 30 816, namely aliphatic urethane acrylate oligomers.

In principle for the separation layer of the invention it is possible to use in particular four types of coating material—for example, acid-curing alkyd-melamine resins, addition-crosslinking polyurethanes, radically curing styrene coating materials, and similar. Particularly advantageous, however, are radiation-curing coating materials, since they cure very rapidly without laborious evaporation of solvents or exposure to heat. Such coating materials have been described, for example, by A. Vrancken (Farbe and Lack 83, 3 (1977) 171).

According to one preferred embodiment, the separation layer consists of a single coating material layer, which in particular is electron beam-cured.

For this purpose the coating material layer preferably employed is applied to a liner and cured by exposure to an electron beam of high energy (150 to 500 kV) under effectively oxygen-free conditions.

With particular advantage the coating material comprises a cured acrylate coating composition. The cured acrylate coating composition is based, according to one particularly advantageous embodiment, on a composition comprising
 30 to 80 wt % of a trifunctional oligomer A,
 0 to 20 wt % of a trifunctional monomer B,
 1 to 30 wt % of a difunctional monomer C, and
 2 to 40 wt % of a laser-sensitive pigment which at the same time is also coloring.

In one preferred embodiment of the present invention, the composition on which the acrylate coating composition is based comprises 50 to 60 wt %, preferably 52 to 58 wt %, of the trifunctional oligomer A, 5 to 15 wt %, preferably 8 to 12 wt %, of the trifunctional monomer B, and 5 to 15 wt %, preferably 8 to 12 wt %, of the difunctional monomer C.

The amount of the laser-sensitive pigment within the acrylate coating compositions of preferred embodiments is dependent on the nature of the pigment used.

In principle the laser-sensitive pigments are admixed in an order of magnitude of 1 wt % up to not more than 40 wt %, preferably in amounts of 2 to 28 wt % or in amounts of 5 to 15 wt %, based on the total weight of the coating material layer.

In the case of carbon black as coloring pigment (in order to achieve the preferred black coloration), for example, 2 to 7 wt % are preferred, whereas in the case of $TiO_2$, for whitening, preferably 15 to 40 wt %, more preferably 22 to 28 wt %, are used. Preference is given to using titanium dioxide in the rutile modification ("$TiO_2$", examples being rutile grades from Kronos).

The trifunctional oligomer A, the trifunctional monomer B, and the difunctional monomer C are also referred to below as component A, component B, and component C, respectively. Compositions comprising components A, B, and C and also the coloring pigment in the stated amount produce particularly temperature-resistant cured acrylate coating compositions.

The separation layer may be provided by curing a composition comprising the components A, B, and C and also the laser-sensitive pigment. For this purpose the composition is crosslinked by means of IR or UV radiation or electron beam curing (hereinafter EBC). Crosslinking by means of EBC is preferred.

The trifunctional oligomer A is an oligomer having three unsaturated (meth)acrylate units per molecule, with a number-average molecular weight $M_n$ (determined by gel permeation chromatography (GPC)) of preferably between 1000 and 5000 g/mol, preferably between 1400 and 3600 g/mol, preferably between 1800 and 2200 g/mol, more preferably between 1900 and 2100 g/mol. Where the molecular weight $M_n$ is within the stated range, this has a positive influence on the long-term temperature resistance of the cured acrylate coating composition, allowing particularly dimensionally stable contrast layers to be obtained.

In one preferred embodiment, the trifunctional oligomer A is selected from the group of polyurethane tri(meth)acrylates and polyester tri(meth)acrylates, of which polyurethane tri(meth)acrylates are particularly preferred. The expression "(meth)acrylate" encompasses acrylates, methacrylates, and mixtures thereof. The trifunctional oligomer A is preferably a polyurethane tri(meth)acrylate, more preferably a polyurethane triacrylate. Polyurethane tri(meth)acrylates are oligomers having in each case three unsaturated (meth)acrylate groups per molecule and also a plurality of, in other words at least two, urethane units. Examples of preferred polyurethane triacrylates are the aliphatic urethane triacrylates CN9260D75® and CN9278D80® from Sartomer, of which CN9260D75® is particularly preferred.

The trifunctional monomer B contains three unsaturated (meth)acrylate units per molecule and in one preferred embodiment of the invention has a molecular weight of 300 to 1000 g/mol, preferably 350 to 800 g/mol, preferably 350 to 600 g/mol, more preferably 400 to 450 g/mol. Component B is preferably selected from the group consisting of propoxylated and ethoxylated glycerol tri(meth)acrylates and propoxylated and ethoxylated trimethylolpropane tri(meth)acrylates of the general formula (I) or mixtures thereof:

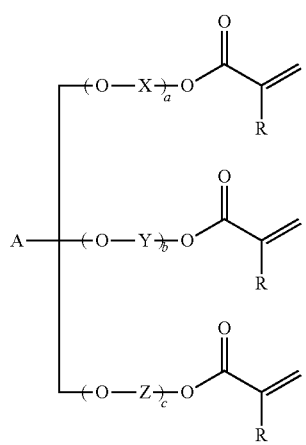

Formula I where R in Formula I is hydrogen or a methyl group; A is hydrogen an ethyl group; X, Y, and Z in each case independently of one another are a propylene or ethylene unit; and a, b, and c in each case independently of one another are an integer from 1 to 4, preferably 1 to 3, and a+b+c is a number between 3 and 12, preferably from 3 to 9. In one particularly preferred embodiment of the invention, X, Y, and Z are propylene units. More preferably the trifunctional monomer is a propoxylated glycerol triacrylate. If the trifunctional monomer B is selected such that the molecular weight is within the above-stated ranges and/or such that the monomer B falls within the above-stated Formula I, then component B as well exerts a positive influence on the temperature resistance of the contrast layer and hence of the laser-writable film.

The difunctional monomer C is a monomer having two unsaturated acrylate units per molecule. Component C preferably has a molecular weight of 100 to 1000 g/mol, preferably 180 to 350 g/mol, more preferably 220 to 280 g/mol, and is preferably selected from the group of the ethylene glycol diacrylates of the general Formula (II):

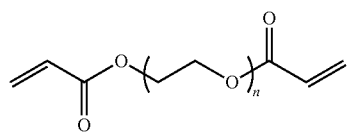

Formula II and of the propylene glycol diacrylates of the general Formula (III):

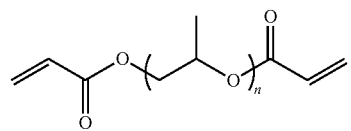

Formula III or mixtures thereof, with n in the Formulas II and III in each case independently of one another being an integer from 1 to 15, preferably from 1 to 9, more preferably from 2 to 6, and especially preferably 3 or 4. In one particularly preferred embodiment of the present invention, the difunctional monomer C is triethylene glycol diacrylate. If the difunctional monomer C is selected such that the molecular weight falls within the above-stated ranges and/or that the monomer C falls within the above-stated Formula II or III, then component C as well exerts a positive influence on the temperature resistance of the contrast layer and hence of the laser-writable film.

In one particularly preferred embodiment of the invention, the separation layer is based on a composition comprising at least one polyurethane triacrylate, preferably CN9260D75® or CN9278D80® from Sartomer as component A, a propoxylated glycerol triacrylate of the Formula I reproduced above as component B, triethylene glycol diacrylate as component C, and also a pigment, an example being titanium dioxide in the rutile modification.

Additionally suitable types of coating material are described in the book "CHEMISTRY & TECHNOLOGY OF UV & EB FORMULATIONS FOR COATINGS, INKS & PAINTS" (VOLUME II: "PREPOLYMERS & REACTIVE DILUENTS FOR UV & EB CURABLE FORMULATIONS" by N S Allan, M S Johnson, P K T Oldring, and S Salim.

In display bonding in particular, a metallically lustrous appearance to adhesive tapes is undesirable. Typically, therefore, adhesive tapes for the securing/mounting of displays are jet black and have a very high opacity. They also serve as a design element in the displays. The black coloration of the separation layer is therefore preferred.

The separation layer is therefore preferably black.

For the coloration, black pigments are added.

Suitable black pigments are, for example, the preferentially employed carbon black, organic azo dyes and/or chromium complexes. Examples of black pigments based on chromium complexes are [1-[(2-hydroxy-4-nitrophenyl)azo]-2-naphthalenolato(2-)][1-[(2-hydroxy nitrophenyl)azo]-2-naphthalenolato(2-)]chromate(1-), bis[1-[(2-hydroxy-4-nitrophenyl)azo]-2-naphthalenolato(2-)]chromate(1-), and bis[1-[(2-hydroxy-5-nitrophenyl)azo]-2-naphthalenolato(2-)]chromate(1-).

Suitable coloring carbon blacks are as follows:
pigment black
lamp black
furnace black
acetylene black
oxidized gas black
thermal black Mention may be made, illustratively, of the Printex grades from Evonik.

As well as the separation layer, one of the layers of pressure sensitive adhesive may also be colored.

Where carbon black particles are admixed as black pigments, they are used preferably in an amount of up to 12 wt %, based on the colored adhesive (i.e., the adhesive blended with color pigments). For the coloring achieved to be outstanding, it is advantageous to use carbon black at least in an amount of 1.2 wt %. Very preferably, where carbon black is used as a black pigment, it is employed in an amount such that the adhesive comprises carbon black in a weight fraction of 2.1 to 3.1 wt %.

As already outlined, the separation layer, as well as the coloring and laser-sensitive pigments, may also comprise other color pigment additives. Particularly if the separation layer consists of multiple coating material layers, the individual layers may have different colorations, with laser-sensitive pigments necessarily being present in at least one layer.

Examples of suitable additives, some of them also having a laser-sensitive character, are color pigments and metal salts, especially copper hydroxide phosphate, or else Iriodin, a pearlescent pigment as available commercially from Merck. These additives are admixed to the base polymer (such as, for example, that described in DE G 81 30 861) in particular in an order of magnitude of 0.05 wt % up to not more than 10 wt %, preferably in amounts of 0.1 to 10 wt %, more particularly of 0.5 to 5 wt %, based on the total weight of the coating material layer.

Coloring additives in the sense of the present invention encompass, without restriction, all coloring additives which find application as dyes, and/or brighteners in paints and coating materials, as are specified, for example, in volume 5 of the Lehrbuch der Lacke and Beschichtungen [Text Book of Paints and Coatings] (Hans Kittel and Jürgen Spille, Hirzel Verlag (Stuttgart), 2003).

With further preference the coating material layer is single-coat. In one variant it is multicoat, and the coats consist of cured, i.e., crosslinked, coating material.

In a preferred configuration, the coating material layers are each arranged directly over one another, meaning that there are no further intermediate layers. This is particularly advantageous in terms in particular of an extremely thin and also cost-effective configuration of the separation layer.

The separation layer is a layer which can be ablated by means of a single laser beam or of multiple laser beams. In this procedure, the engraving layer is ablated at the locations onto which a laser beam is directed with appropriate energy. With sufficient input of energy, the separation layer is locally completely removed.

It is likewise conceivable for the separation layer to be only partly ablated at some locations.

The separation layer provided in accordance with the invention is present very preferably over the full area and in the form of a continuous layer between the first layer of pressure sensitive adhesive and the second layer of pressure sensitive adhesive.

The parting layer provided in accordance with the invention is applied advantageously in a thickness of 0.5 to 100 μm, more particularly 1 to 30 μm, more especially 5 to 25 μm.

The separation layer is removed by a laser, more particularly by ablation. The procedure here in particular is such that the laser is beamed through the laminate from one side. In this case the separation layer may be removed over its whole area, or removal takes place only in one or more regions or in portions. In this way it is possible to control the size intended for the contact area that remains. It is possible in this way to generate a predetermined breakage point, at which separation takes place under little further exposure, whereas initially (that is, after the laser irradiation) a connection is still maintained. Likewise, in the case of complete removal of the separation layer, a 100% parting of the laminate is possible within less than a second. Substrates originally joined on a long-term basis can therefore be separated very quickly and cleanly from one another in a simple way.

The lasers used may in principle be customary, standard lasers. The laser wavelength used is preferably selected such that the laser radiation is able to emit with maximum transmission through the pressure sensitive adhesive layers and any other layers of the laminate. In the wavelength range from 800 to 2000 nm, for example, customary pressure sensitive acrylate adhesives have very little, or no, disposition to absorb. In this range, the adhesive systems used in accordance with the invention are also translucent.

Preference is given to using solid state lasers, whose wavelength is outstandingly suitable for the transradiation of customary adhesives and release materials. With particular preference, Nd:YAG solid state lasers are used. An Nd:YAG laser (short for neodymium-doped yttrium aluminum garnet laser) is a solid state laser which as its active medium uses a neodymium-doped YAG crystal and emits mainly infrared radiation with the wavelength 1064 nm. Further transitions exist at 946 nm, 1320 nm and 1444 nm. The wavelength of the light emitted by this laser is situated—as described above—in the region of 1064 μm. This wavelength is not absorbed in general by the adhesive layers used, and so these materials are translucent for the wavelength in question. Moreover, the carrier layers as well—made of polyethylene terephthalate (PET), for example—can have this wavelength beamed through them without suffering damage. Conversion of the radiation to different wavelengths may be performed as and when required by generation of the second (532 nm) and third (355 nm) harmonics. In principle, however, all gas lasers, dye lasers, solids lasers, metal vapor lasers, and excimer lasers having the appropriate wavelengths are suitable.

The sets of laser parameters used for an application, and the associated laser strategy, are dependent on the adhesive systems used (absorbing and nonabsorbing adhesives). Preference is given to using the following parameters:
power: 0.1 to 12 watts
speed: 100 to 12.000 mm/sec
frequency: 1 to 200 kHz
focus: 25 to 250 μm
pulse time: 30 to 300 ns A pressure sensitive adhesive is understood in this specification, as is customary within the general usage, as a material which—in particular at room temperature—is permanently tacky and also adhesive. Characteristics of a pressure sensitive adhesive are that it can be applied by pressure to a substrate and remains adhering there, with no further definition of the pressure to be applied or the period of exposure to this pressure. In certain cases, depending on the precise nature of the pressure sensitive adhesive, the temperature, and the atmospheric humidity and also the substrate, exposure to a minimal pressure of short duration, which does not go beyond gentle contact for a brief moment, is enough to achieve the adhesion effect, while in other cases a longer-term period of exposure to a high pressure may be necessary.

Pressure sensitive adhesives have particular, characteristic viscoelastic properties which result in the permanent tack and adhesiveness.

A characteristic of these adhesives is that when they are mechanically deformed, there are processes of viscous flow and there is also development of elastic forces of resilience. The two processes have a certain relationship to one another in terms of their respective proportion, in dependence not only on the precise composition, the structure, and the degree of crosslinking of the pressure sensitive adhesive under consideration, but also on the rate and duration of the deformation, and on the temperature.

The proportional viscous flow is necessary for the achievement of adhesion. Only the viscous components, brought about by macromolecules with relatively high mobility, permit effective wetting and effective flow onto the substrate where bonding is to take place. A high viscous flow component results in high tack (also referred to as surface stickiness) and hence often also in a high peel strength. Highly crosslinked systems, crystalline polymers, or polymers with glasslike solidification lack flowable components and are therefore in general devoid of tack or possess only little tack at least.

The proportional elastic forces of resilience are necessary for the attainment of cohesion. They are brought about, for example, by very long-chain macromolecules with a high degree of coiling, and also by physically or chemically crosslinked macromolecules, and they allow the transmission of the forces that act on an adhesive bond. As a result of these forces of resilience, an adhesive bond is able to withstand a long-term load acting on it, in the form of a long-term shearing load, for example, sufficiently over a relatively long time period. For the more precise description and quantification of the extent of elastic and viscous components, and also of the relationship between the components, it is possible to employ the variables of storage modulus (G') and loss modulus (G"), which can be determined by means of Dynamic Mechanical Analysis (DMA). G' is a measure of the elastic component, G" a measure of the viscous component, of a substance. Both variables are dependent on the deformation frequency and the temperature.

The variables can be determined with the aid of a rheometer. In that case, for example, the material under investigation is exposed in a plate/plate arrangement to a sinusoidally oscillating shearing stress. In the case of instruments operating with shear stress control, the deformation is measured as a function of time, and the time offset of this deformation is measured relative to the introduction of the shearing stress. This time offset is referred to as phase angle δ.

The storage modulus G' is defined as follows: G'=(τ/γ)·cos(δ) (τ=shear stress, γ=deformation, δ=phase angle=phase shift between shear stress vector and deformation vector). The definition of the loss modulus G" is as follows: G"=(τ/γ)·sin(δ) (τ=shear stress, γ=deformation, δ=phase angle=phase shift between shear stress vector and deformation vector).

A substance is considered in general to be pressure-sensitively adhesive, and is defined as being pressure-sensitively adhesive for the purposes of this specification, if at room temperature, presently by definition 23° C., in the deformation frequency range from $10^0$ to $10^1$ rad/sec, G' is located at least partly in the range from $10^3$ to $10^7$ Pa and if G" likewise is located at least partly within this range. "Partly" means that at least one section of the G' curve lies within the window described by the deformation frequency range from $1^0$ inclusive up to $10^1$ inclusive rad/sec (abscissa) and by the G' value range from $10^3$ inclusive up to $10^7$ inclusive Pa (ordinate), and if at least one section of the G" curve is likewise located within this window.

The two layers of pressure sensitive adhesive preferably comprise at least one polymer selected from the group consisting of poly(meth)acrylates, natural rubber, synthetic rubbers, including more particularly vinylaromatic block copolymers, silicones, polyurethanes, and mixtures of two or more of the above-recited polymers. More preferably the outer layer of pressure sensitive adhesive comprises at least one poly(meth)acrylate. It is preferable, moreover, if at least one of the two pressure sensitive adhesive layers contains at least 40 wt % of one or more poly(meth)acrylates. More particularly the outer layer of pressure sensitive adhesive contains no polymers other than one or more poly(meth)acrylates.

"Poly(meth)acrylates" are understood, in line with the general understanding, to be polymers accessible via radical polymerization of acrylic and/or methylacrylic monomers and also, optionally, further copolymerizable monomers. The term "poly(meth)acrylate" in accordance with the invention encompasses not only polymers based on acrylic acid and derivatives thereof but also those based on acrylic acid and methylacrylic acid and derivatives thereof, and those based on methacrylic acid and derivatives thereof, the polymers always including acrylic esters, methacrylic esters, or mixtures of acrylic and methacrylic esters. The poly(meth)acrylates of the outer layer of pressure sensitive adhesive preferably have an average molar mass $M_w$ of not more than 2 000 000 g/mol.

The monomers of the poly(meth)acrylates of the outer layer of pressure sensitive adhesive, and their quantitative composition, are preferably selected such that the so-called Fox equation (E1)

$$\frac{1}{T_g} = \sum_n \frac{w_n}{T_{g,n}} \tag{E1}$$

(cf. T. G. Fox, Bull. Am. Phys. Soc. 1 (1956) 123) produces a $T_g$ value for the polymer of ≤25° C. A value of this kind is particularly advantageous for pressure sensitive adhesives which are used substantially at room temperature.

In equation E1, n represents the serial number of the monomers used, $w_n$ the mass fraction of the respective monomer n (wt %), and $T_g$,n the respective glass transition temperature of the homopolymer of the respective monomer n, in Kelvins.

The two layers of pressure sensitive adhesive preferably comprise one or more poly(meth)acrylates which can be traced back to the following monomer composition:

a) acrylic esters and/or methacrylic esters of the Formula (F1)

CH2=C(R')(COOR") (F1), where R'=H or $CH_3$ and R" is an alkyl radical having 1 to 30 C atoms, more preferably having 4 to 14 C atoms, and very preferably having 4 to 9 C atoms;

b) olefinically unsaturated monomers having functional groups which exhibit reactivity with crosslinker substances;

c) optionally further olefinically unsaturated monomers, which are copolymerizable with the monomers (a) and (b).

Examples of monomers a) are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, such as, for example, isobutyl acrylate, 2-ethylhexyl acrylate, 2-ethylhexyl methacrylate, isooctyl acrylate, isooctyl methacrylate. More preferably is a methyl, an n-butyl, and a 2-ethylhexyl group, more particularly an n-butyl and a 2-ethylhexyl group, or the monomers a) are selected from n-butyl acrylate and 2-ethylhexyl acrylate.

The monomers b) are preferably olefinically unsaturated monomers having functional groups which are able to enter into a reaction with epoxide groups. More preferably the monomers b) each contain at least one functional group selected from the group consisting of hydroxyl, carboxyl, sulfonic acid and phosphonic acid groups, acid anhydride functions, epoxide groups, and substituted or unsubstituted amino groups. More particularly the monomers b) are selected from the group consisting of acrylic acid, methacrylic acid, itaconic acid, maleic acid, fumaric acid, crotonic acid, aconitic acid, dimethylacrylic acid, β-acryloyloxypropionic acid, trichloracrylic acid, vinylacetic acid, vinylphosphonic acid, maleic anhydride, 2-hydroxyethyl acrylate, 3-hydroxypropyl acrylate, 2-hydroxyethyl methacrylate, 3-hydroxypropyl methacrylate, 6-hydroxyhexyl methacrylate, allyl alcohol, glycidyl acrylate, and glycidyl methacrylate. Especially preferably the monomers b) are acrylic acid and/or methacrylic acid, more particularly acrylic acid.

Suitable monomers c) include in principle all vinylically functionalized compounds which are copolymerizable with the monomers a) and the monomers b). Through selection and amount of the monomers c) it is possible advantageously to regulate properties of the pressure sensitive adhesive of the invention.

The monomers c) are more preferably selected from the group consisting of methyl acrylate, ethyl acrylate, n-propyl acrylate, methyl methacrylate, ethyl methacrylate, benzyl acrylate, benzyl methacrylate, sec.-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethyl acrylate, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl) methacrylamide, N-(ethoxymethyl)acrylamide, N-(n-octadecyl)acrylamide, N,N-dialkyl-substituted amides, especially N,N-dimethylacrylamide, N,N-dimethylmethacrylamide, N-benzylacrylamide, N-isopropylacrylamide, N-tert-butylacrylamide, N-tert-octylacrylamide, N-methylolacrylamide, N-methylolmethacrylamide; additionally acrylonitrile, methacrylonitrile; vinyl ethers such as vinyl methyl ether, ethyl vinyl ether, and vinyl isobutyl ether; vinyl esters such as vinyl acetate; vinyl chloride, vinyl halides, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, 2-polystyrene-ethyl methacrylate (molecular weight $M_w$ from 4000 to 13 000 g/mol), and poly(methyl methacrylate)-ethyl methacrylate ($M_w$ from 2000 to 8000 g/mol). More particularly the monomer c) is methyl acrylate.

The monomers c) may advantageously also be selected such that they contain functional groups which support radiation-chemical crosslinking (by electron beams or UV, for example). Suitable copolymerizable photoinitiators are, for example, benzoin acrylate and acrylate-functionalized benzophenone derivatives. Monomers which support crosslinking by electron bombardment are, for example, tetrahydrofurfuryl acrylate, N-tert-butylacrylamide, and allyl acrylate.

With particular preference, where the layers of pressure sensitive adhesive comprise a plurality of poly(meth)acrylates, all of the poly(meth)acrylates in the layers of pressure sensitive adhesive can be traced back to the above-described monomer composition. More particularly, all of the poly(meth)acrylates in the layers of pressure sensitive adhesive can be traced back to a monomer composition consisting of acrylic acid, n-butyl acrylate, 2-ethylhexyl acrylate, and methyl acrylate.

With very particular preference, the poly(meth)acrylate or all of the poly(meth)acrylates in the layers of pressure sensitive adhesive can be traced back to the following monomer composition:
  acrylic acid 1 to 10 wt %
  methyl acrylate 1 to 15 wt %
  2-ethylhexyl acrylate 30 to 60 wt %
  n-butyl acrylate 25 to 50 wt %,
the proportions of the monomers adding up to 100 wt %.

According to one variant of the invention, a pressure sensitive adhesive is selected which comprises at least the following two components:
  at 60 wt % to 90 wt %, preferably 65 wt % to 80 wt % in the adhesive, a first polymer component based on polyacrylate (called polyacrylate component hereinafter)
  at 10 wt % to 40 wt %, preferably 15 wt % to 30 wt % in the adhesive, a second polymer component, substantially immiscible with the polyacrylate component, based on elastomer, more particularly on a synthetic rubber (called elastomer component hereinafter).

The weight percentage figures above are based on the sum total of polyacrylate component and elastomer components as 100 wt %.

The second polymer component is substantially immiscible with the first polymer component, and so the adhesive in the layer of adhesive is present in at least two separate phases. More particularly, one phase forms a matrix and the other phase forms a multiplicity of domains arranged in the matrix.

Homogeneous mixtures are substances mixed at a molecular level; homogeneous systems, correspondingly, are single-phase systems. The substances on which they are based are referred to synonymously as being "homogeneously miscible" and "compatible" with one another. Correspondingly, two or more components are synonymously "not homogeneously miscible" and "not compatible" if after intimate combination they form at least two phases rather than one homogeneous system. Components regarded as synonymously "partly homogeneously miscible", "partly compatible" and "partially compatible" are those which on intimate combination with one another (for example, by shearing, in the melt or in solution, and subsequently elimination of the solvent) form at least two phases which are each rich in one of the components, but where one or both of the phases may in each case comprise a greater or lesser part of the other components, incorporated homogeneously.

The polyacrylate component per se is preferably a homogeneous phase. The elastomer component may be present homogeneously in itself, or may have a multi-phase nature in itself, as known for microphase-separating block copolymers. Polyacrylate component and elastomer component are presently selected such that—after intimate combination—at 23° C. (i.e., the customary usage temperature for adhesives) they are substantially immiscible. "Substantially immiscible" means that the components either are not homogeneously miscible with one another at all, meaning that none of the phases contains a homogeneously incorporated fraction of the second component, or that the components have so little partial compatibility—in other words, that one or both components can homogeneously accommodate only so small a fraction of the other respective component. The components in question are then regarded as being "substantially free" from the other respective component.

The adhesive used, accordingly, is in at least two-phase morphology at least at room temperature (23° C.). Very preferably the polyacrylate component and the elastomer component are substantially not homogeneously miscible in a temperature range from 0° C. to 50° C., more preferably still from −30° C. to 80° C.

The first, polyacrylate-based polymer component can preferably be traced back predominantly to acrylic and/or methacrylic monomers, more particularly to an extent of at least 50 wt %.

The second, elastomer-based polymer component can preferably be traced back predominantly to one or more synthetic rubbers, more particularly to an extent of at least 60 wt %.

The synthetic rubbers are further preferably selected from the group of the thermoplastic block copolymers whose structure may be represented by one of the following formulas:

$$A\text{-}B \tag{II}$$

$$A\text{-}B\text{-}X\text{-}(A'\text{-}B')_n \tag{IIIa}$$

$$A\text{-}B\text{-}X\text{-}(B'\text{-}A')_n \tag{IIIb}$$

$$Q_mY \tag{IV}$$

where
- A or A' is a polymer formed by polymerizing a vinylaromatic, such as styrene or α-methylstyrene, for example,
- B or a is a polymer obtained from an isoprene, butadiene or a mixture of butadiene and isoprene, or a mixture of butadiene and styrene, or containing, entirely or partly, ethylene, propylene, butylene and/or isobutylene, and
- X and Y are each an optional linking group,
- Q in each case is an arm of a multiarm block copolymer and is bonded to Y, and advantageously each Q independently is formed by $(A^*\text{-}B^*)_n$, and $A^*$ and $B^*$ independently of one another are selected in accordance with the above definition of A and B,
- n is an integer between 1 and 4, and
- m is an integer greater than 2.

This adhesive is described comprehensively and in particularly suitable embodiments in WO 2015/014582 A1, which is hereby expressly referenced.

In one embodiment of the invention, the layers of pressure sensitive adhesive comprise at least one tackifying resin, which is selected from the group consisting of pinene resins, indene resins, and rosins, and also their disproportionated, hydrogenated, polymerized, and esterified derivatives and salts; aliphatic and aromatic hydrocarbon resins, terpene resins, terpene-phenol resins, and also mixtures of two or more of the above-recited tackifying resins. Of the hydrocarbon resins, it is possible to employ all resins that are compatible (soluble) with the poly(meth)acrylate in question; reference may be made more particularly to all aliphatic, aromatic, and alkylaromatic hydrocarbon resins, hydrocarbon resins based on pure monomers, hydrogenated hydrocarbon resins, functional hydrocarbon resins, and natural resins, and especially to $C_5$ to $C_9$ hydrocarbon resins. With particular preference the layers of pressure sensitive adhesive comprise at least one tackifying resin selected from terpene-phenol resins and $C_5$ to $C_9$ hydrocarbon resins. More particularly the layers of pressure sensitive adhesive comprise a terpene-phenol resin.

Substrates particularly suitable for bonding via the adhesive system of the invention are metals, glass and/or plastics. The substrates to be bonded may be alike or different.

It may possibly be necessary for the surfaces of the substrates that are to be bonded to be pretreated by a physical, chemical and/or physicochemical process. Advantageous here, for example, is the application of a primer or of an adhesion promoter composition.

Suitable plastics substrates are, for example, acrylonitrile-butadiene-styrene copolymers (ABS), polycarbonates (PC), ABS/PC blends, PMMA, polyamides, glass fiber-reinforced polyamides, polyvinyl chloride, polyvinylene fluoride, cellulose acetate, cycloolefin copolymers, liquid crystal polymers (LCPs), polylactide, polyetherketones, polyetherimide, polyethersulfone, polymethacrylomethylimide, polymethylpentene, polyphenyl ethers, polyphenylene sulfide, polyphthalamide, polyurethanes, polyvinyl acetate, styrene-acrylonitrile copolymers, polyacrylates and/or polymethacrylates, polyoxymethylene, acrylate-styrene-acrylonitrile copolymers, polyethylene, polystyrene, polypropylene and/or polyesters such as, for example, polybutylene terephthalates (PBT) and/or polyethylene terephthalate (PET).

Black-coloured Novaduran PBT grades from Mitsubishi Engineering-Plastics (MEP) are also suitable as plastic substrates. The PBT is reinforced with 30 wt. % glass fibres (Novaduran 510G30LVV). The glass fibre content can also be selected lower, values above 30 wt. % are also possible.

Furthermore, the PBT can be mixed with other plastics such as PET, polystyrene or polycarbonate.

Substrates may have undergone coating, printing, vapor deposition, or sputtering. The substrates to be bonded may take on any desired form which is necessary for the use of the resultant assembly. In the simplest form the substrates are planar.

The laminate of the invention is present more particularly in the form of a double-sided pressure sensitive adhesive tape.

In the sense of this invention, the general expression "adhesive tape" (pressure sensitive adhesive tape), synonymously also "adhesive strip" (pressure sensitive adhesive strip), embraces all sheetlike structures, such as two-dimensionally extended films or film sections, tapes with extended length and limited width, tape sections and the like, and also, lastly, diecuts or labels.

The adhesive tape therefore has a longitudinal extent (x direction) and a lateral extent (y direction). The adhesive tape also has a thickness (z direction) which runs perpendicularly to the two extents, with the lateral extent and longitudinal extent being greater by a multiple than the thickness. The thickness is very largely the same, preferably exactly the same, over the entire superficial extent of the adhesive tape as defined by length and width.

In order to adjust the properties of the double-sided adhesive tape, it is possible to use various layers of pressure sensitive adhesive. The properties which can be influenced in this way include thickness, stiffness, flexibility, temperature resistance, elasticity, and flame retardance of the adhesive tape. It is, however, also possible to use the same pressure sensitive adhesives for the two layers of pressure sensitive adhesive.

The laminate of the invention or the adhesive tapes of the invention are usually wound at the end of the production process to give a roll in the form of an Archimedean spiral. In order to prevent the pressure sensitive adhesives coming into contact with one another in the case of double-sidedly adhesive tapes, the adhesive tapes before being wound are applied to a covering material (also referred to as release material) which is wound up together with the adhesive tape. The skilled person knows of such covering materials under the names of liners or release liners. As well as the covering of double-sidedly adhesive tapes, liners are also used to envelop labels.

A liner (release paper, release film) is not part of an adhesive tape or label, but rather only an auxiliary to the production or storage thereof or for further processing by diecutting. Furthermore, a liner, in contrast to an adhesive tape carrier, is not firmly joined to a layer of adhesive.

The laminate or adhesive tape may be made available in fixed lengths such as product by the meter, for example, or else in the form of a continuous product on rolls (Archimedean spiral), i.e., disk-shaped rolls of adhesive tape, referred to in the language of the art as "pancakes".

The adhesive tape may alternatively be coiled like a textile yarn onto a core, its length being substantially greater than the width of the adhesive tape. By the overlaying of a rotary movement of the core and an axial movement of the core or of the adhesive tape guiding member, the adhesive tape initially forms a first, radially innermost ply of helical turns. To finish off the first ply and enter into the second ply, the orientation of the axial movement is inverted, with the rotary movement unchanged. To finish off the second ply and enter into the third ply, the orientation of the axial movement is again inverted, i.e., it reverts to the original orientation, while the rotary movement continues to be unchanged. The pitch angle remains constant between each of the orientation inversion points. In this way, numerous plies of turns can be formed, their turns intersecting one another (cross-wound coils).

Laminates of the invention are used preferably in widths of 9 to 50 mm, more particularly 19 to 25 mm. The roll widths selected are customarily 10, 15, 19, 25 and 30 mm. The laminates may alternatively be sold as log product, in widths of 1000 to 1300 mm, for example.

There are a great multiplicity of possible applications for the laminate of the invention. The disassembly of touch panels has already been mentioned. In view of the major importance of cell phones, this is a particularly important area of use. On the one hand, there is a desire for very strong and also, in particular, sealing bonding of the displays of cell phones. On the other hand, though, it is frequently necessary for the display to be removed. The laminate of the invention is outstandingly suitable for this intended use.

A topic of increasing importance, lastly, is that of "reworkability". In the automotive industry, for example, the requirements with regard to disposal of the products, individualized by material, at the end of their life cycle are increasing. It is therefore important that components which consist of different materials must be separated into the individual components again and before they are disposed of, even if these components were joined to one another "inseparably" beforehand. The present invention enables a very strong and long-term bond between different components, while nevertheless allowing these components to be separated on demand.

Measurement Methods

The measurements are carried out—unless expressly otherwise mentioned—under test conditions of 23±1° C. and 50±5% relative humidity.

Molecular Weight

The molecular weight determinations for the number-average molecular weights $M_n$ and the weight-average molecular weights $M_w$ are made by means of gel permeation chromatography (GPC). The eluent used is THF (tetrahydrofuran) with 0.1 vol % of trifluoroacetic acid. The measurement takes place at 23° C. The precolumn used is PSS-SDV, 10μ, $10^3$ Å, ID 8.0 mm×50 mm. Separation takes place using the columns PSS-SDV, 10μ, $10^3$ and also $10^5$ and $10^7$ Å each with ID 8.0 mm×300 mm. The sample concentration is 0.5 g/l, the flow rate 0.5 ml per minute. Calibration is carried out using the commercially available ReadyCal Poly(styrene) high kits from PSS Polymer Standard Service GmbH, Mainz, Germany. Using the Mark-Houwink parameter K and alpha, this is converted universally into polymethyl methacrylate (PMMA), so that the data are reported in PMMA mass equivalents.

The invention is elucidated in more detail below by an example and FIGS. 1 and 2, without wishing the invention to be restricted as a result.

EXAMPLE

An FAYb (fiber laser) laser is used which emits at 1.06 μm. The manufacturer of the laser is SUNX/Panasonic Electric Works. The laser is marketed under the designation LP-V10.

The laser is distinguished by the following parameters:

| Panasonic LP-V10 Series | |
|---|---|
| Wavelength | 1060 nm |
| Laser type | Y fiber laser |
| Laser class | 4 |
| Focal length | 190 mm |
| Marking field | 90 × 90 mm |
| Laser mode | 12 watts |
| Laser power | single mode |
| Q-switch | pulsed |
| Beam quality | M2 = 1.2 |
| Peak pulse power | 20 kW |

| | | |
|---|---|---|
| | Panasonic LP-V10 Series | |
| | Pulse frequency | 1-200 Hz |
| | Pulse duration | 30 ns |
| | Focus size | 50 µm |
| | Deflection rate | 6000 mm/s |

Production of Specimens

To produce specimens of laminates of the invention, in examples 1 to 4 below, a coating material layer as separation layer was first coated on the bottom face of a film having a thickness of 50 µm and consisting of a transparent PET film.

To produce the coating material layer, the raw materials specified in the examples were combined in an automatic disperser (Dissolver CN10 from VMA Getzmann) with water-cooled dispersing vessel (capacity 1 L) and with a 60 mm dissolver disk, and homogenized at a temperature of 40° C. for 20 minutes at 8000 rpm. The resulting composition was applied by doctor blade in a layer thickness of 15 µm to the film surface, and crosslinked by electron beam curing at 80 kGy and 240 kV to form a solid coating material layer.

Example 1: Composition of the Coating Material Layer (Black)

| | | |
|---|---|---|
| 84 parts | Ebecryl 284 ® | Difunctional urethane acrylate (oligomer) from Cytec (contains around 12% HDDA), $M_n$ 1200 g/mol |
| 4 parts | Laromer HDDA ® | Difunctional acrylate (reactive diluent) from BASF hexanediol diacrylate, $M_n$ 226 g/mol |
| 8 parts | DVE-3 ® | triethylene glycol divinyl ether (reactive diluent) from BASF, $M_n$ 202 g/mol |
| 7 parts | Printex 25 ® | Carbon black |

Example 2: Composition of the Coating Material Layer (White)

| | | |
|---|---|---|
| 51 parts | Ebecryl 284 ® | Difunctional urethane acrylate (oligomer) from Cytec (contains around 12% HDDA), $M_n$ 1200 g/mol |
| 3 parts | Laromer HDDA ® | Difunctional acrylate (reactive diluent) from BASF hexanediol diacrylate, $M_n$ 226 g/mol |
| 6 parts | DVE-3 ® | triethylene glycol divinyl ether (reactive diluent) from BASF, $M_n$ 202 g/mol |
| 40 parts | Kronos 2160 ® | Titanium dioxide |

Example 3: Composition of the Coating Material Layer (Black)

| | | |
|---|---|---|
| 69 parts | CN 9260 ® | Trifunctional urethane acrylate (oligomer) from Sartomer, $M_n$ 2000 g/mol |
| 12 parts | SR9020 ® | Trifunctional acrylate (reactive diluent) from Sartomer Propoxylated glyceryl triacrylate, $M_n$ 428 g/mol |
| 12 parts | SR 272 ® | Difunctional acrylate (reactive diluent), from Sartomer Triethylene glycol diacrylate, $M_n$ 258 g/mol |
| 7 parts | Printex 25 ® | Carbon black |

Example 4: Composition of the Coating Material Layer (White)

| | | |
|---|---|---|
| 55 parts | CN 9260 ® | Trifunctional urethane acrylate (oligomer) from Sartomer, $M_n$ 2000 g/mol |
| 10 parts | SR9020 ® | Trifunctional acrylate (reactive diluent) from Sartomer Propoxylated glyceryl triacrylate, $M_n$ 428 g/mol |
| 10 parts | SR 272 ® | Difunctional acrylate (reactive diluent), from Sartomer Triethylene glycol diacrylate, $M_n$ 258 g/mol |
| 25 parts | Kronos 2160 ® | Titanium dioxide |

The free surface of the coating material layer was coated with an acrylate-based adhesive at an application weight of 50 g/m². The pressure sensitive adhesive used was a resin-modified acrylate adhesive consisting of 80 wt % of an acrylate copolymer and 20 wt % of terpene-phenol resin. The copolymer was obtained by polymerization of 47.5 wt % of n-butyl acrylate, 47.5 wt % of 2-ethylhexyl acrylate, 2 wt % of glycidyl methacrylate and 1 wt % of acrylic acid.

This layer of adhesive was covered with a liner. The PET film was subsequently removed. The now exposed surface of the coating material layer was coated with the same acrylate-based adhesive, again with an application weight of 50 g/m².

The resultant double-sided adhesive tape is bonded—with the liner being removed—between two glass bodies, so that these bodies are joined to one another. The glass bodies each have a thickness of 2 mm.

A test matrix composed of laser power, frequency, and deflection rate is used to establish the optimal ablation of the separation layer between the two layers of adhesive.

The following parameters are set on the laser:

| Parameter | |
|---|---|
| Laser power | 45.0% |
| Scan speed | 1000 mm/sec. |
| Laser pulse cycle | 50 µs |
| Line width | 0.15 mm |
| Marking pitch | 0.15 mm |

Figure 2:
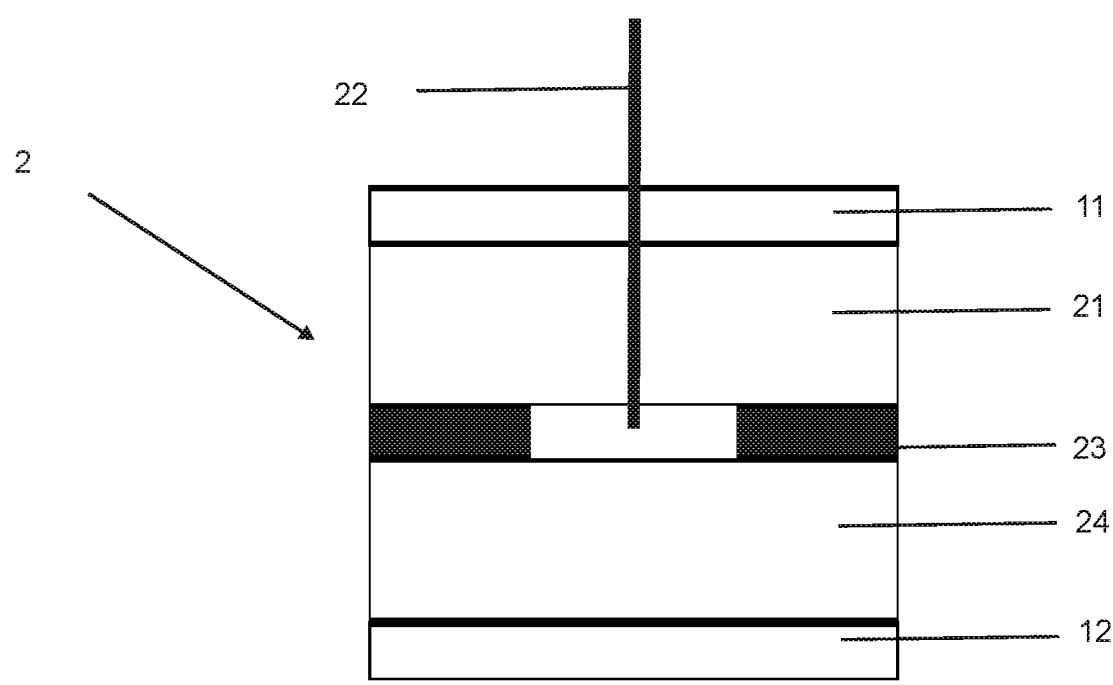
FIG. 2 illustrates construction and use of a double-sided adhesive tape according to at least one embodiment of the present disclosure.

FIG. 2 shows the construction of the double-sided adhesive tape 2 and also the use thereof. The laminate 2 is located between two substrates 11 and 12, which in this case both consist of glass layers.

The adhesive tape 2 has a 15 µm separation layer 23. Respective layers 21 and 24 of adhesive are applied to the top and bottom faces of the separation layer 23.

The laser beam 22 ablates the separation layer 23.

What is claimed is:

1. A laminate configured to be separated after long-term bonding, the laminate comprising:
    a) a first pressure sensitive adhesive layer;
    b) a separation layer; and
    c) a second pressure sensitive adhesive layer,
    wherein
    the separation layer comprises
        a laser-sensitive pigment that provides a visible coloring to the separation layer, and
        a cured coating material which is at least partly removable by laser irradiation,
    the first pressure sensitive adhesive layer and/or the second pressure sensitive adhesive layer being laser beam-translucent, and the cured coating material comprises a cured acrylate coating material composition comprising the following composition:
- 30 to 80 wt % of a trifunctional oligomer A,
- 0 to 20 wt % of a trifunctional monomer B,
- 1 to 30 wt % of a difunctional monomer C, and
- 2 to 40 wt % of a coloring pigment.

2. The laminate according to claim 1, wherein the cured coating material of the separation layer is formed from one or more radiation-curable resins.

3. The laminate according to claim 2, wherein the one or more radiation-curable resins comprise at least one of unsaturated polyesters, epoxy acrylates, polyester acrylates, and urethane acrylates.

4. The laminate according to claim 1, wherein the laser-sensitive pigment is admixed in an amount of at least 1 wt % up to not more than 40 wt %, based on a total weight of the cured coating material of the separation layer.

5. The laminate according to claim 4, wherein the laser-sensitive pigment is admixed in an amount from at least 5 to 15 wt %, based on the total weight of the cured coating material of the separation layer.

6. The laminate according to claim 1, wherein the laser-sensitive pigment comprises carbon black or titanium dioxide.

7. The laminate according to claim 6, wherein, if carbon black is present as the laser-sensitive pigment, the carbon black is present in an amount from 2 to 7 wt %.

8. The laminate according to claim 6, wherein, if titanium dioxide is present as the laser-sensitive pigment, and the titanium dioxide is present in an amount from 15 to 40 wt %.

9. The laminate according to claim 8, wherein the titanium dioxide is present in an amount from at least 22 to 28 wt % or the separation layer is applied in a thickness of 5 to 25 μm.

10. The laminate according to claim 1, wherein the separation layer is applied in a thickness from at least 0.5 to 100 μm.

11. The laminate according to claim 1, wherein the separation layer consists of a single coating material layer.

12. The laminate according to claim 1, wherein at least one of the first pressure sensitive adhesive layer and the second pressure sensitive adhesive layer contains at least 40 wt % of one or more poly(meth)acrylates.

13. The laminate according to claim 1, wherein at least one of the first pressure sensitive adhesive layer and the second pressure sensitive adhesive layer is a pressure sensitive adhesive which comprises at least the following two components:
- a polyacrylate component present in an amount from at least 60 wt % to 90 wt %, and
- an elastomer component present in an amount from at least 10 wt % to 40 wt %.

14. The laminate according to claim 1, wherein the laser-sensitive pigment is black or the separation layer is black.

15. A method for parting a long-term bond produced by means of the laminate according to claim 1, the method comprising:
removing at least part of an area of the separation layer by means of laser irradiation such that the laminate separates into a first part-laminate and a second part-laminate.

16. The method according to claim 15, wherein forces are applied to at least one of the first part-laminate and the second part-laminate that increase the spacing of the two part-laminates from one another.

17. The method according to claim 15, wherein an infrared laser is used for the laser irradiation.

18. The method according to claim 15, wherein an entire area of the separation layer is removed.

19. A method comprising:
bonding at least two components together with the laminate according to claim 1 such that the at least two components are separatable on demand, wherein at least two components consist of different materials and are components usable in the automotive industry and/or the electronics industry.

* * * * *